United States Patent [19]
Usami

[11] Patent Number: 6,157,508
[45] Date of Patent: Dec. 5, 2000

[54] MAGNETIC RECORDING/PLAYBACK APPARATUS

[75] Inventor: Hiroshi Usami, Tokyo, Japan

[73] Assignee: TEAC Corporation, Tokyo, Japan

[21] Appl. No.: 09/231,614

[22] Filed: Jan. 14, 1999

[30] Foreign Application Priority Data

Jan. 16, 1998 [JP] Japan ................................. 10-007007

[51] Int. Cl.[7] ............................ G11B 15/14; G11B 15/12
[52] U.S. Cl. .............................................. 360/64; 360/61
[58] Field of Search .................... 360/64, 61, 46, 360/31

[56] References Cited

U.S. PATENT DOCUMENTS

| | | | |
|---|---|---|---|
| 4,827,360 | 5/1989 | Kawasaki et al. | 360/64 |
| 4,965,681 | 10/1990 | Takimoto | 360/64 |
| 5,195,003 | 3/1993 | Nishimura et al. | 360/124 |

FOREIGN PATENT DOCUMENTS

| | | |
|---|---|---|
| 62-109203 | 5/1987 | Japan . |
| 9-245307 | 9/1997 | Japan . |

*Primary Examiner*—W. Chris Kim
*Attorney, Agent, or Firm*—Anderson, Kill & Olick, P.C.

[57] ABSTRACT

A magnetic recording/playback apparatus for recording information to a magnetic tape and playing back the information from the magnetic tape, includes first and second recording heads which are provided on a rotary cylinder and alternately record information to the magnetic tape. First and second playback heads are provided on the rotary cylinder at predetermined positions relative to the first and second recording heads, and alternately play back the information from the magnetic tape. A crosstalk canceling switch device cancels crosstalk at outputs of the first and second playback heads when the apparatus is run in a read-after-write mode, the crosstalk canceling switch device being set in a closed position during the read-and-write mode and interconnecting the output of the first playback head and the output of the second playback head.

10 Claims, 9 Drawing Sheets

MAGNETIC RECORDING/PLAYBACK APPARATUS

BACKGROUND OF THE INVENTION

(1) Field of the Invention

The present invention generally relates to a magnetic recording/playback apparatus, and more particularly to a magnetic recording/playback apparatus which is adapted to eliminate crosstalk during a read-after-write mode operation.

(2) Description of the Related Art

A high-density recording video tape recorder having a read-after-write mode is known. In the video tape recorder of the above type, a digital signal is written to a magnetic tape at a high recording density by using recording heads provided on a rotary cylinder, and the recorded signal is read from the magnetic tape by using playback heads provided on the rotary cylinder. The carrier frequency of the above type is higher than that of a normal-density recording video tape recorder, and the video tape recorder of the above type can perform a read-after-write mode operation. During the read-and-write mode, the signal is played back from the magnetic tape by the playback heads immediately after the signal is recorded in the magnetic tape by the recording heads.

The video tape recorder of the above type includes, for example, four recording heads, four playback heads and four erasing heads, and these heads are arranged on a periphery of the rotary cylinder in a given formation around a central axis of the rotary cylinder. The recording heads are comprised of a pair of first recording heads (L-channel and R-channel) and a pair of second recording heads (L-channel and R-channel). The playback heads are comprised of a pair of first playback heads (L-channel and R-channel) and a pair of second playback heads (L-channel and R-channel). The erasing heads are comprised of a pair of first erasing heads (L-channel and R-channel).

The two heads of each pair are arranged 6.34 degrees apart from each other around the central axis of the rotary cylinder. The first recording heads and the second recording heads are arranged 180 degrees apart from each other on the periphery of the rotary cylinder, and these heads are arranged at confronting positions around the central axis of the rotary cylinder. The first playback heads and the second playback heads are arranged 180 degrees apart from each other on the periphery of the rotary cylinder, and these heads are arranged at confronting positions around the central axis of the rotary cylinder. Further, the first erasing heads and the second erasing heads are arranged 180 degrees apart from each other at confronting positions around the central axis of the rotary cylinder.

In the video tape recorder of the above type, the erasing heads on the rotary cylinder are at positions that correspond to the positions of the relevant recording heads when the rotary cylinder is rotated around the center axis in the forward direction by 322 degrees. The playback heads on the rotary cylinder are at positions that correspond to the positions of the relevant recording heads when the rotary cylinder is rotated around the central axis in the reverse direction by 108 degrees.

At a start of a read-after-write mode operation by the video tape recorder of the above type, one of the erasing heads on the rotary cylinder erases the recorded signal on a track of the magnetic tape. After the rotation of the rotary cylinder 322 degrees around the central axis, one of the recording heads writes a digital signal to the track of the magnetic tape at the location of the erasing performed by the erasing head. Further, after the rotation of the rotary cylinder 108 degrees around the central axis, one of the playback heads reads the recorded signal from the track of the magnetic tape at the location of the writing performed by the recording head. These steps are repetitively performed by the erasing heads, the recording heads and the playback heads of the rotary cylinder every time the rotary cylinder is rotated 180 degrees around the central axis of the rotary cylinder.

Figure 9:
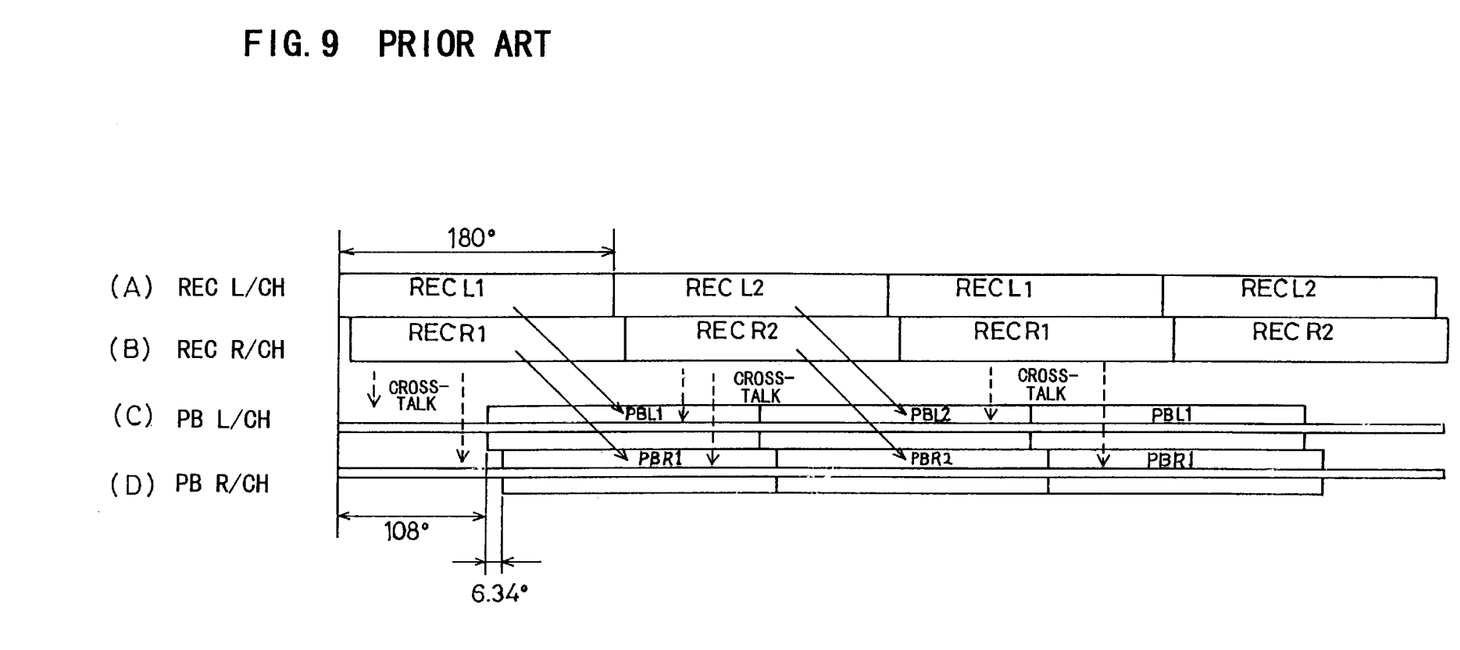
FIG. 9 is a time chart for explaining crosstalk during a read-after-write mode operation of a video tape recorder.

FIG. 9 is a time chart for explaining crosstalk during the read-after-write mode operation of the video tape recorder of the above type.

In FIG. 9, (A) indicates the recording operations of the first and second recording heads (L-channel), (B) indicates the recording operations of the first and second recording heads (R-channel), (C) indicates the playback operations of the first and second playback heads (L-channel), and (D) indicates the playback operations of the first and second playback heads (R-channel). For the sake of simplification, in FIG. 9, for example, "REC L1" denotes the L-channel first recording head and "REC R1" denotes the R-channel first recording head.

As described above, the two heads of each pair are arranged 6.34 degrees apart from each other around the central axis of the rotary cylinder. There is a difference between the time of the recording by the L-channel recording heads (for example, "REC L1") and the time of the recording by the R-channel recording heads (for example, "REC R1").

As shown in FIG. 9, one of the recording heads (for example, "REC L1" or "REC R1") writes the signal to the magnetic tape, and after the rotation of the rotary cylinder 108 degrees around the central axis, one of the playback heads (for example, "PB L1" or "PB R1") starts reading the recorded signal from the magnetic tape at the location of the writing. At the start of the playback of the playback head "PB L1" or "PB R1", the recording of the recording head "REC L1" or "REC R1" is not yet terminated. Further, during the playback operation of the playback head "PB L1" or "PB R1", one of the subsequent recording heads (for example, "REC L2" or "REC R2") starts writing the signal to the magnetic tape.

As indicated by the dotted-line arrows in FIG. 9, crosstalk may occur on the playback head because the recording current from the recording heads or the erasing current from the erasing heads tend to leak in or mix with the playback signal output by the playback head. The signal-to-noise (S/N) ratio of the playback signal output by the playback head becomes degraded due to the crosstalk.

In order to reduce the degradation of the S/N ratio, a conventional video tape recorder is adapted to use differential inputs of a head amplifier and parallel signal lines. Further, in order to reduce the degradation of the S/N ratio, a conventional video tape recorder is adapted to incorporate an improved error correction and/or a Viterbi decoding in a signal processing circuit of the video tape recorder.

However, the above-mentioned measures taken by the conventional video tape recorders are effective only in reducing the degradation of the S/N ratio but do not yield a substantial elimination of the crosstalk during the read-after-write mode operation. Further, the differential inputs of the head amplifier and the parallel signal lines or the improved error correction and/or the Viterbi decoding require a large-size complicated circuit for the conventional video tape recorder, which will raise the manufacturing cost significantly.

SUMMARY OF THE INVENTION

An object of the present invention is to provide an improved magnetic recording/playback apparatus in which the above-described problems are eliminated.

Another object of the present invention is to provide a magnetic recording/playback apparatus which is adapted to eliminate the crosstalk during the read-after-write mode by using a simple configuration with no need for significantly increasing the manufacturing cost.

The above-mentioned objects of the present invention are achieved by a magnetic recording/playback apparatus for recording information to a magnetic tape and playing back the information from the magnetic tape, including: first and second recording heads which are provided on a rotary cylinder and alternately record information to the magnetic tape; first and second playback heads which are provided on the rotary cylinder at predetermined positions relative to the first and second recording heads and alternately play back the information from the magnetic tape; and a crosstalk canceling switch device which cancels crosstalk at outputs of the first and second playback heads when the apparatus is run in a read-after-write mode, the crosstalk canceling switch device being set in a closed position during the read-and-write mode and interconnecting the output of the first playback head and the output of the second playback head.

In the magnetic recording/playback apparatus of a preferred embodiment of the present invention, the crosstalk canceling switch device acts to eliminate the crosstalk at the first and second playback heads during the read-after-write mode operation. The magnetic recording/playback apparatus of the preferred embodiment is effective not only in reducing the degradation of the S/N ratio but also in yielding a substantial elimination of the crosstalk during the read-after-write mode operation. According to the magnetic recording/playback apparatus of the present invention, it is possible to provide a simple configuration with no need for significantly increasing the manufacturing cost.

BRIEF DESCRIPTION OF THE DRAWINGS

Other objects, features and advantages of the present invention will be more apparent from the following detailed description when read in conjunction with the accompanying drawings in which.

DETAILED DESCRIPTION OF THE PREFERRED EMBODIMENTS

A description will now be given of the preferred embodiments of the present invention with reference to the accompanying drawings.

Figure 2A:
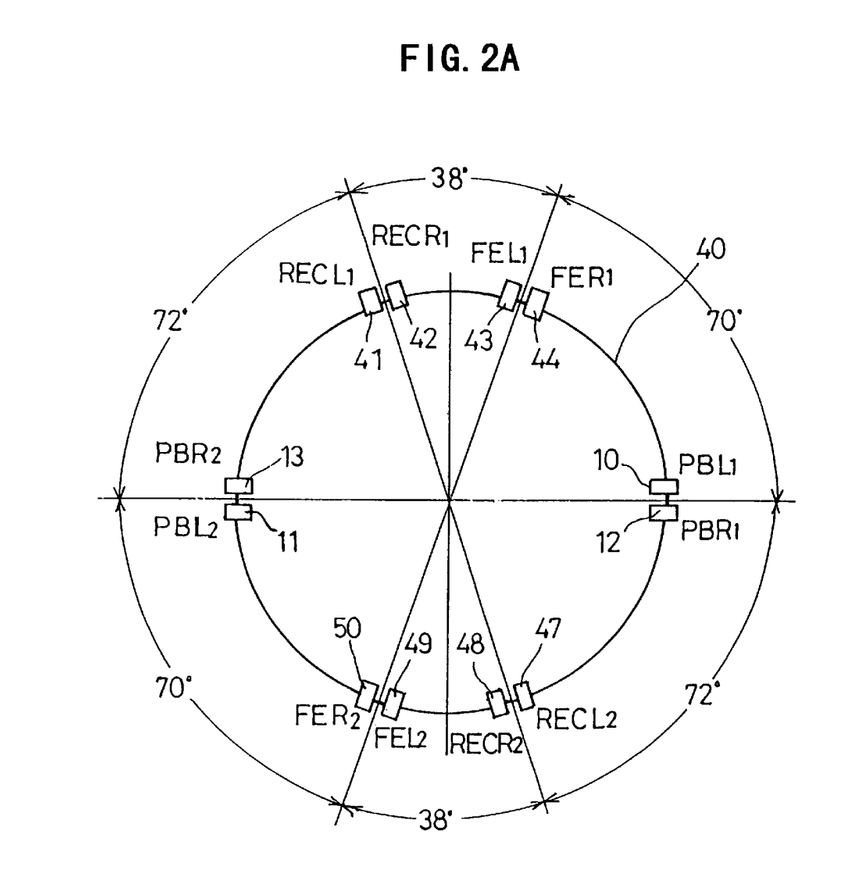
FIG. 2A and FIG. 2B are diagrams for explaining the arrangement of playback heads, recording heads and erasing heads on a rotary cylinder of a video tape recorder to which one embodiment of the present invention is applied.

FIG. 2A shows the arrangement of playback heads, recording heads and erasing heads around a central axis of a rotary cylinder of a video tape recorder to which one embodiment of the present invention is applied.

As shown in FIG. 2A, a rotary cylinder 40 includes on its periphery a pair of first playback heads 10 and 12 (indicated by "PB L1" and "PB R1" in FIG. 2A), a pair of second playback heads 11 and 13 (indicated by "PB L2" and "PB R2"), a pair of first recording heads 41 and 42 (indicated by "REC L1" and "REC R1"), a pair of second recording heads 47 and 48 (indicated by "REC L2" and "REC R2"), a pair of first erasing heads 43 and 44 (indicated by "FE L1" and "FE R1"), and a pair of second erasing heads 49 and 50 (indicated by "FE L2" and "FE R2").

In the rotary cylinder 40 of FIG. 2A, the two heads of each pair are arranged 6.34 degrees apart from each other around the central axis of the rotary cylinder 40. The first recording heads 41 and 42 and the second recording heads 47 and 48 are arranged 180 degrees apart from each other on the periphery of the rotary cylinder 40, and these heads are arranged at confronting positions around the central axis of the rotary cylinder 40. The first playback heads 10 and 12 and the second playback heads 11 and 13 are arranged 180 degrees apart from each other on the periphery of the rotary cylinder 40, and these heads are arranged at confronting positions around the central axis of the rotary cylinder 40. Further, the first erasing heads 43 and 44 and the second erasing heads 49 and 50 are arranged 180 degrees apart from each other at confronting positions around the central axis of the rotary cylinder 40.

In the rotary cylinder 40 of FIG. 2A, the erasing heads 43, 44, 49 and 50 are at positions on the rotary cylinder 40 which are 322 degrees apart from the positions of the corresponding recording heads 41, 42, 47 and 48 in the advancing direction with respect to the magnetic tape passing around the central axis of the rotary cylinder 40. The playback heads 10, 12, 11 and 13 are at positions on the rotary cylinder 40 which are 108 degrees apart from the positions of the corresponding recording heads 41, 42, 47 and 48 in the retarding direction with respect to the magnetic tape passing around the central axis of the rotary cylinder 40.

During the recording or the playback by the rotary cylinder 40 of FIG. 2A, the magnetic tape is moved on the rotary cylinder 40 in a slanted direction, and the magnetic tape is moved in the direction opposite to the rotating direction of the rotary cylinder 40. By the recording operation of the recording heads 41, 42, 47 and 48, the signal is recorded in the magnetic tape so that a track pattern is produced on the magnetic tape in a slanted direction. By the playback operation of the playback heads 10, 12, 11 and 13, the recorded signal is reproduced from the track pattern of the magnetic tape.

Figure 2B:
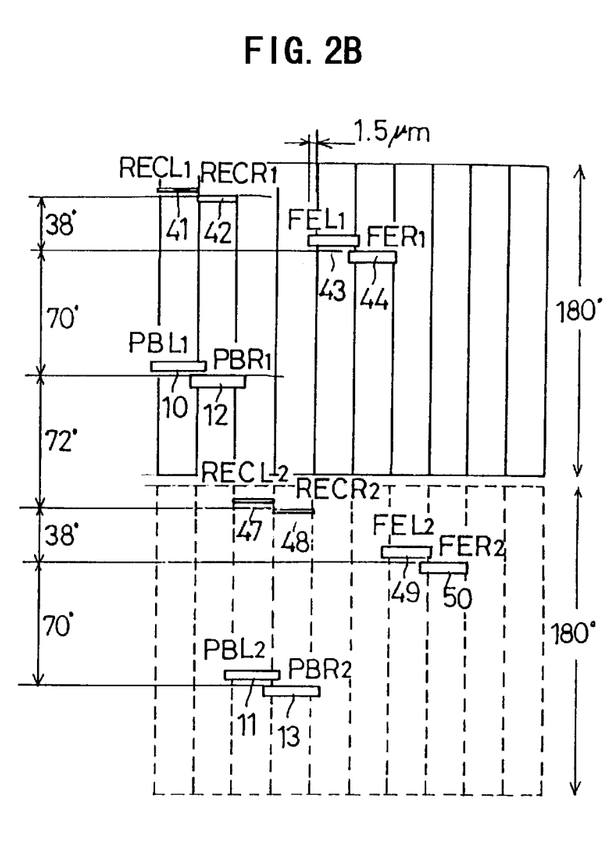

FIG. 2B shows a track pattern of a magnetic tape which is produced by the rotary cylinder 40 of FIG. 2A. The erasing heads 43 and 44 erase the recorded signals on the tracks of the magnetic tape. After the 322-degree rotation of the rotary cylinder 40 around the central axis, the recording heads 41 and 42 writes digital signals to the tracks of the magnetic tape at the locations of the erasing performed by the erasing heads. Further, after the 108-degree rotation of the rotary cylinder 40 around the central axis, the playback heads 10 and 12 reads the recorded signals from the tracks of the magnetic tape at the location of the writing performed by the recording heads. These steps are repetitively performed by the erasing heads 43, 44, 49 and 50, the recording heads 41, 42, 47 and 48 and the playback heads 10, 12, 11 and 13 of the rotary cylinder 10 every time the rotary cylinder is rotated 180 degrees around the central axis of the rotary cylinder as shown in FIG. 2B.

Figure 3:
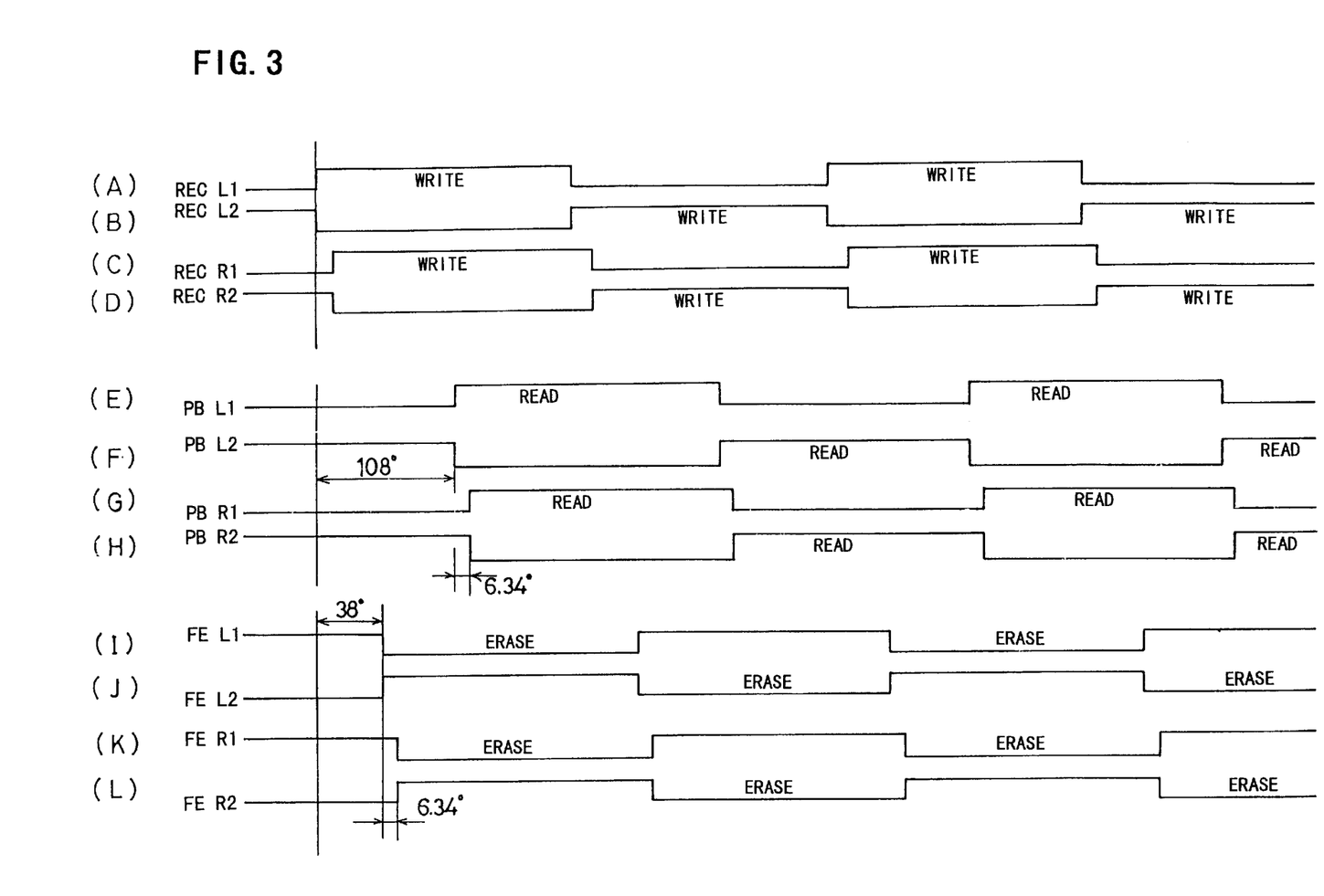
FIG. 3 is a time chart for explaining alternate operations of the heads of the rotary cylinder.

FIG. 3 is a time chart for explaining alternate operations of the recording heads, the playback heads and the erasing heads of the rotary cylinder 40.

In FIG. 3, (A), (B), (C) and (D) show alternate writing operations of the recording heads 41, 47, 42 and 48 of the rotary cylinder 40. The recording head 41 ("REC L1") and the recording head 47 ("REC L2") are arranged at the confronting positions on the rotary cylinder 40, and the recording head 42 ("REC R1") and the recording head 48 ("REC R2") are arranged at the confronting positions on the rotary cylinder 40. The first recording heads 41 and 42 and the second recording heads 47 and 48 alternately perform the writing of the signals to the magnetic tape in a repetitive manner. The writing operations of the recording heads 41 and 47 are started 6.34 degrees earlier than the writing operations of the recording heads 42 and 48.

In FIG. 3, (E), (F), (G) and (H) show alternate playback operations of the playback heads 10, 11, 12 and 13 of the rotary cylinder 40. The playback head 10 ("PB L1") and the playback head 11 ("PB L2") are arranged at the confronting positions on the rotary cylinder 40, and the playback head 12 ("PB R1") and the playback head 13 ("PB R2") are arranged at the confronting positions on the rotary cylinder 40. The first playback heads 10 and 12 and the second playback heads 11 and 13 alternately perform the reading of the recorded signals from the magnetic tape in a repetitive manner. The reading operations of the first playback heads 10 and 12 are started 108 degrees later from the writing operations of the first recording heads 41 and 42. The reading operations of the second playback heads 11 and 13 are started 108 degrees later from the writing operations of the second recording heads 47 and 48.

In FIG. 3, (I), (J), (K) and (L) show alternate erasing operations of the erasing heads 43, 49, 44 and 50 of the rotary cylinder 40. The erasing head 43 ("FE L1") and the erasing head 49 ("FE L2") are arranged at the confronting positions on the rotary cylinder 40, and the erasing head 44 ("FE R1") and the erasing head 50 ("FE R2") are arranged at the confronting positions on the rotary cylinder 40. The first erasing heads 43 and 44 and the second erasing heads 49 and 50 alternately perform the erasing of the recorded signals from the magnetic tape in a repetitive manner. The erasing operations of the first erasing heads 43 and 44 are started 322 degrees earlier than the writing operations of the first recording heads 41 and 42. The erasing operations of the second erasing heads 49 and 50 are started 322 degrees earlier than the writing operations of the second recording heads 47 and 48.

Figure 1:
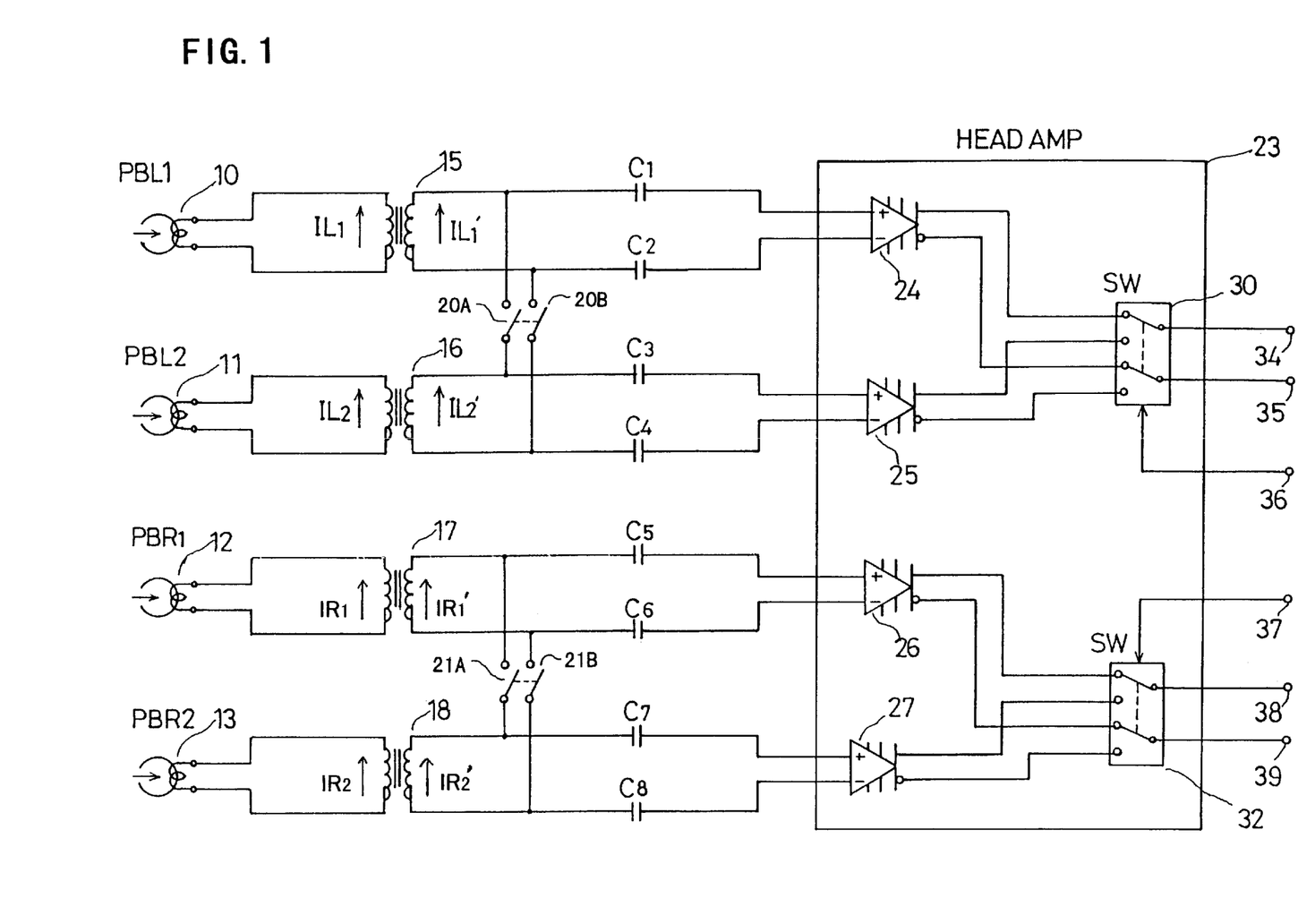
FIG. 1 is a circuit diagram of a first embodiment of a magnetic recording/playback apparatus of the present invention.

FIG. 1 shows a first embodiment of the magnetic recording/playback apparatus of the present invention.

As shown in FIG. 1, in the present embodiment of the magnetic recording/playback apparatus, the playback heads 10, 11, 12 and 13 supply the signals, which are reproduced from the magnetic tape, to the rotor-side inputs of transformers 15, 16, 17 and 18 of a rotary transformer. A switch 20A is connected between a stator-side high-voltage output of the transformer 15 and a stator-side high-voltage output of the transformer 16. A switch 20B is connected between a stator-side low-voltage output of the transformer 15 and a stator-side low-voltage output of the transformer 16. The switch 20A and the switch 20B are turned ON (in the closed position) or OFF (in the open position) at the same time.

Further, in the magnetic recording/playback apparatus of FIG. 1, a switch 21A is connected between a stator-side high-voltage output of the transformer 17 and a stator-side high-voltage output of the transformer 18. A switch 21B is connected between a stator-side low-voltage output of the transformer 17 and a stator-side low-voltage output of the transformer 18. The switch 21A and the switch 21B are turned ON (in the closed position) or OFF (in the open position) at the same time.

In the magnetic recording/playback apparatus of FIG. 1, the switches 20A, 20B, 21A and 21B are set in the closed position (or turned ON) during the read-after-write mode, and the switches 20A, 20B, 21A and 21B are set in the open position (or turned OFF) during the normal read mode.

As shown in FIG. 1, the signal at the stator-side output of the transformer 15 is supplied through a capacitor C1 and a capacitor C2 to an amplifier 24 of a head amplifier 23. The signal at the stator-side output of the transformer 16 is supplied through a capacitor C3 and a capacitor C4 to an amplifier 25 of the head amplifier 23. The signal at the stator-side output of the transformer 17 is supplied through a capacitor C5 and a capacitor C6 to an amplifier 26 of the head amplifier 23. The signal at the stator-side output of the transformer 18 is supplied through a capacitor C7 and a capacitor C8 to an amplifier 27 of the head amplifier 23.

In the head amplifier 23, the signal output by the amplifier 24 is supplied to a switch 30, and the signal output by the amplifier 25 is supplied to the switch 30. The switch 30 includes an input terminal 36 and output terminals 34 and 35. A switching signal is supplied through the input terminal 36 to the switch 30. When the switching signal input to the switch 30 is set in an ON state, the switch 30 is set in a first position so that the switch 30 passes the signal output by the amplifier 24, to the output terminals 34 and 35. When the switching signal input to the switch 30 is set in an OFF state, the switch 30 is set in a second position so that the switch 30 passes the signal output by the amplifier 25, to the output terminals 34 and 35.

Suppose that the setting of the switching signal, input to the switch 30, in the ON state or the OFF state is controlled in accordance with the timing of the alternate playback operations of the playback heads 10 and 11 indicated by (E) and (F) in FIG. 3.

Further, in the head amplifier 23, the signal output by the amplifier 26 is supplied to a switch 32, and the signal output by the amplifier 27 is supplied to the switch 32. The switch 32 includes an input terminal 37 and output terminals 38 and 39. A switching signal is supplied through the input terminal 37 to the switch 32. When the switching signal input to the switch 32 is set in an ON state, the switch 32 is set in a first position so that the switch 32 passes the signal output by the amplifier 26, to the output terminals 38 and 39. When the switching signal input to the switch 32 is set in an OFF state, the switch 32 is set in a second position so that the switch 32 passes the signal output by the amplifier 27, to the output terminals 38 and 39.

Suppose that the setting of the switching signal, input to the switch 32, in the ON state or the OFF state is controlled in accordance with the timing of the alternate playback operations of the playback heads 12 and 13 indicated by (G) and (H) in FIG. 3.

A description will now be given of an operation of the magnetic recording/playback apparatus of the present embodiment during the read-after-write mode.

As shown in FIG. 3, the reading operations of the first playback heads 10 and 12 ("PB L1" and "PB R1") are started after the 108-degree rotation of the rotary cylinder 40 from the start of the writing operations of the first recording heads 41 and 42 ("REC L1" and "REC R1"). Suppose that a playback current "IL1 (PB)" and a playback current "IR1 (PB)" are supplied to the transformer 15 and the transformer 17 by the playback head 10 and the playback head 12 through the reading operations, and, at the same time, a recording current "IL1 (REC)" and a recording current "IR1 (REC)" are supplied from the nearby recording heads (or the nearby erasing heads) to the playback head 10 and the playback head 12 so as to cause the crosstalk.

Similarly, the reading operations of the second playback heads 11 and 13 ("PB L2" and "PB R2") are started after the 108-degree rotation of the rotary cylinder 40 from the start of the writing operations of the second recording heads 47 and 48 ("REC L2" and "REC R2"). A similar recording current is supplied from the nearby recording heads (or the nearby erasing heads) to the playback head 11 and the playback head 13 so as to cause the crosstalk.

Suppose that a playback current "IL1'" and a playback current "IR1'" flow through the stator of the transformer 15 and through the stator of the transformer 17 under the above condition when the switches 20A, 20B, 21A and 21B are set in the open position. Further, suppose that a playback current "IL2'" and a playback current "IR2'" flow through the stator of the transformer 16 and through the stator of the transformer 18 under the above condition when the switches 20A, 20B, 21A and 21B are set in the open position. The above-mentioned playback currents "IL1'", "IL2'", "IR1'" and "IR2'" are represented by the following formulas.

$$IL1'=IL1(PB)+IL1(REC) \quad (1)$$

$$IL2'=IL1(REC) \quad (2)$$

$$IR1'=IR1(PB)+IR1(REC) \quad (3)$$

$$IR2'=IR1(REC) \quad (4)$$

On the other hand, if the switches 20A and 20B are set in the closed position during the read-after-write mode, a playback current "IL1''" which flows through the stator of the transformer 15 under the above condition of the magnetic recording/playback apparatus of the present embodiment is represented as follows.

$$IL1''=(IL1'-IL2')/2 \quad (5)$$

Substituting the formulas (1) and (2) into the above formula (5), $$IL1''=IL1(PB)/2 \quad (6)$$

That is, when the switches 20A and 20B are set in the closed position during the read-after-write mode, the crosstalk components "IL1 (REC)" supplied from the nearby recording heads are opposite in polarity, and it is possible that the switches 20A and 20B cancel the crosstalk components at the playback heads each other. Hence, when the switches 21A and 21B are set in the closed position during the read-after-write mode, a playback current "IR1''" which flows through the stator of the transformer 17 under the above condition is represented as follows.

$$IR1''=IR1(PB)/2 \quad (7)$$

It is apparent from the above formulas that the magnetic recording/playback apparatus of the present embodiment acts to substantially cancel the crosstalk at the playback heads 10, 11, 12 and 13 during the read-after-write mode operation, although the amplitude of the playback currents is reduced to half of the original level.

Similar to the switches 20A and 20B, if the switches 21A and 21B are set in the closed position during the read-after-write mode, a playback current "IL2''" and a playback current "IR2''", which flow through the stator of the transformer 16 and through the stator of the transformer 18 under above conditions of the magnetic recording/playback apparatus of the present embodiment, are represented in the same manner as in the above formulas (6) and (7).

In the present embodiment, the switches 20A, 20B, 21A and 21B are set in the closed position during the read-after-write mode, and act to cancel the crosstalk at the playback heads 10, 11, 12 and 13 during the read-after-write mode operation, although the amplitude of the playback currents is reduced to half of the original level. Accordingly, the magnetic recording/playback apparatus of the present embodiment is effective not only in reducing the degradation of the S/N ratio as in the conventional video tape recorder, but also in yielding a substantial elimination of the crosstalk during the read-after-write mode operation. It is possible that the magnetic recording/playback apparatus of the present embodiment provides a simple configuration with no need for significantly increasing the manufacturing cost.

Figure 4:
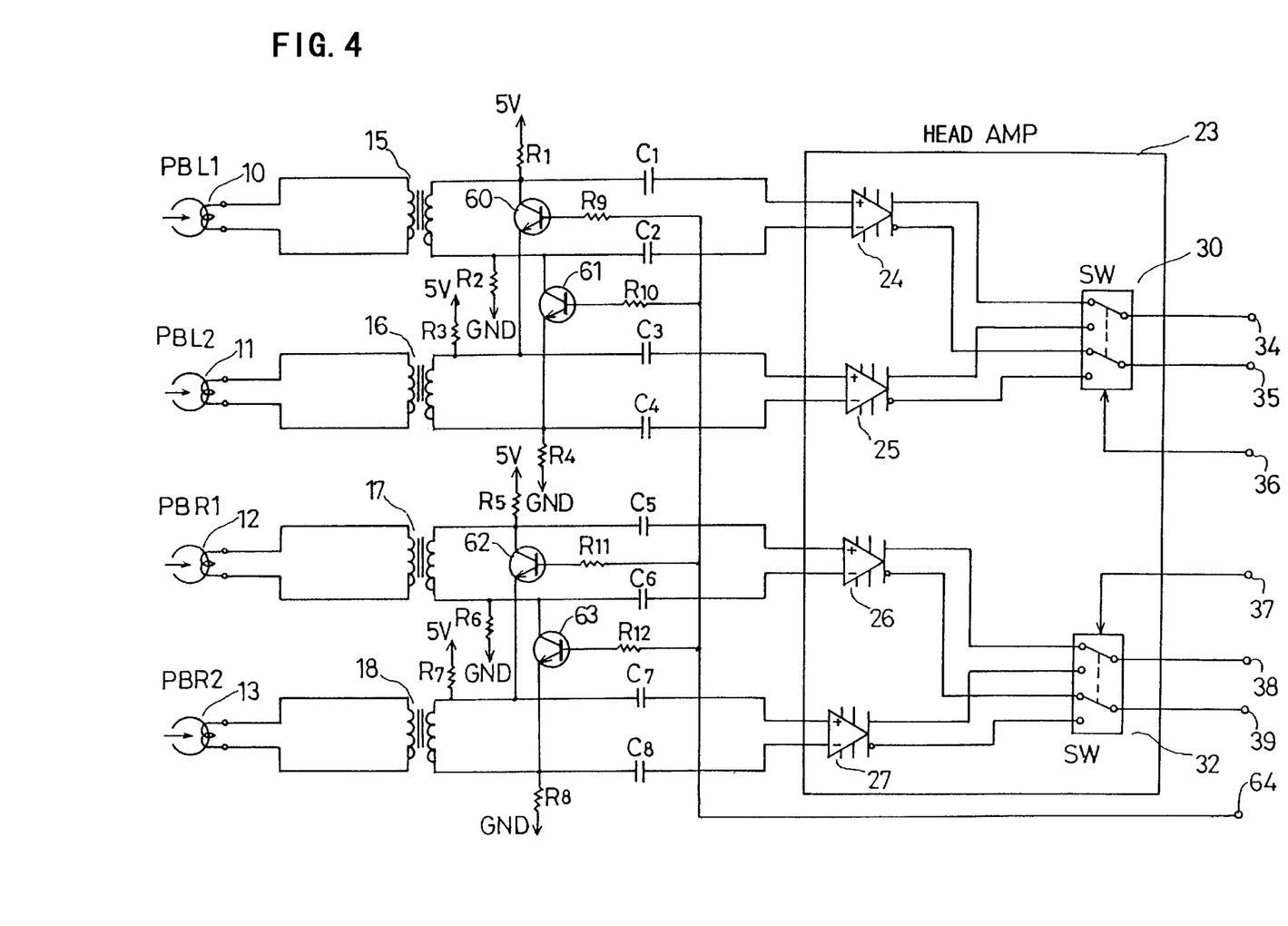
FIG. 4 is a circuit diagram of a second embodiment of the magnetic recording/playback apparatus.

Next, FIG. 4 shows a second embodiment of the magnetic recording/playback apparatus of the present invention. In FIG. 4, the elements which are essentially the same as corresponding elements in FIG. 1 are designated by the same reference numerals, and a description thereof will be omitted.

In the magnetic recording/playback apparatus of FIG. 4, n-p-n bipolar transistors 60, 61, 62 and 63 are provided instead of the switches 20A, 20B, 21A and 21B in the embodiment of FIG. 1. Each of the bipolar transistors 60, 61, 62 and 63 has an adequately low level of a resistance that is needed to turn the transistor ON (or in the closed position).

Generally, the stator and the rotor of the rotary transformer have a DC resistance on the order of several ohms, and it is necessary that the switch provided in the rotary transformer has an ON-setting resistance, needed to set the switch in the closed position, that is less than the order of several ohms. If it is difficult to set the ON-setting resistance of the switch at an adequately low level, it is necessary to increase the equivalent impedance of the switch by connecting a resistor on the order of 50 to 100 ohms to the stator of the rotary transformer.

In the magnetic recording/playback apparatus of FIG. 4, a supply voltage (for example, +5 V) is supplied through a resistor R1 to the stator-side high-voltage output of the transformer 15, and the stator-side low-voltage output of the transformer 15 is grounded (GND) via a resistor R2. The supply voltage is supplied through a resistor R3 to the stator-side high-voltage output of the transformer 16, and the stator-side low-voltage output of the transformer 16 is grounded via a resistor R4. The transistor 60 is connected between the stator-side high-voltage output of the transformer 15 and the stator-side high-voltage output of the transformer 16. Specifically, the transistor 60 has a base connected to an external input terminal 64 via a resistor R9, a collector connected to the stator-side high-voltage output of the transformer 15, and an emitter connected to the stator-side high-voltage output of the transformer 16.

Further, the transistor 61 is connected between the stator-side low-voltage output of the transformer 15 and the stator-side low-voltage output of the transformer 16. Specifically, the transistor 61 has a base connected to the input terminal 64 via a resistor R10, a collector connected to the stator-side low-voltage output of the transformer 15, and an emitter connected to the stator-side low-voltage output of the transformer 16.

Further, in the magnetic recording/playback apparatus of FIG. 4, the supply voltage (for example, 5 V) is supplied through a resistor R5 to the stator-side high-voltage output of the transformer 17, and the stator-side low-voltage output of the transformer 17 is grounded via a resistor R6. The supply voltage is supplied through a resistor R7 to the stator-side high-voltage output of the transformer 18, and the stator-side low-voltage output of the transformer 18 is grounded via a resistor R8. The transistor 62 is connected between the stator-side high-voltage output of the transformer 17 and the stator-side high-voltage output of the transformer 18. Specifically, the transistor 62 has a base connected to the input terminal 64 via a resistor R11, a collector connected to the stator-side high-voltage output of the transformer 17, and an emitter connected to the stator-side high-voltage output of the transformer 17. Further, the transistor 63 is connected between the stator-side low-voltage output of the transformer 17 and the stator-side low-voltage output of the transformer 18. Specifically, the transistor 63 has a base connected to the input terminal 64 via a resistor R12, a collector connected to the stator-side low-voltage output of the transformer 17, and an emitter connected to the stator-side low-voltage output of the transformer 18.

In the present embodiment of the magnetic recording/playback apparatus, the transistors 60, 61, 62 and 63 are set in the closed position (or conduct electricity) during the read-after-write mode by supplying a high-level signal through the input terminal 64 to the base of each of the transistors 60, 61, 62 and 63. The transistors 60, 61, 62 and 63 are set in the open position (or do not conduct electricity) during the normal read mode by supplying a ground-level signal through the input terminal 64 to the base of each of the transistors 60, 61, 62 and 63.

Similar to the operation of the embodiment of FIG. 1, the transistors 60, 61, 62 and 63 in the present embodiment are set in the closed position during the read-after-write mode, and act to cancel the crosstalk at the playback heads 10, 11, 12 and 13 during the read-after-write mode operation. Accordingly, the magnetic recording/playback apparatus of the present embodiment is effective not only in reducing the degradation of the S/N ratio as in the conventional video tape recorder, but also in yielding a substantial elimination of the crosstalk during the read-after-write mode operation. It is possible that the magnetic recording/playback apparatus of the present embodiment provides a simple configuration with no need for significantly increasing the manufacturing cost.

Figure 5:
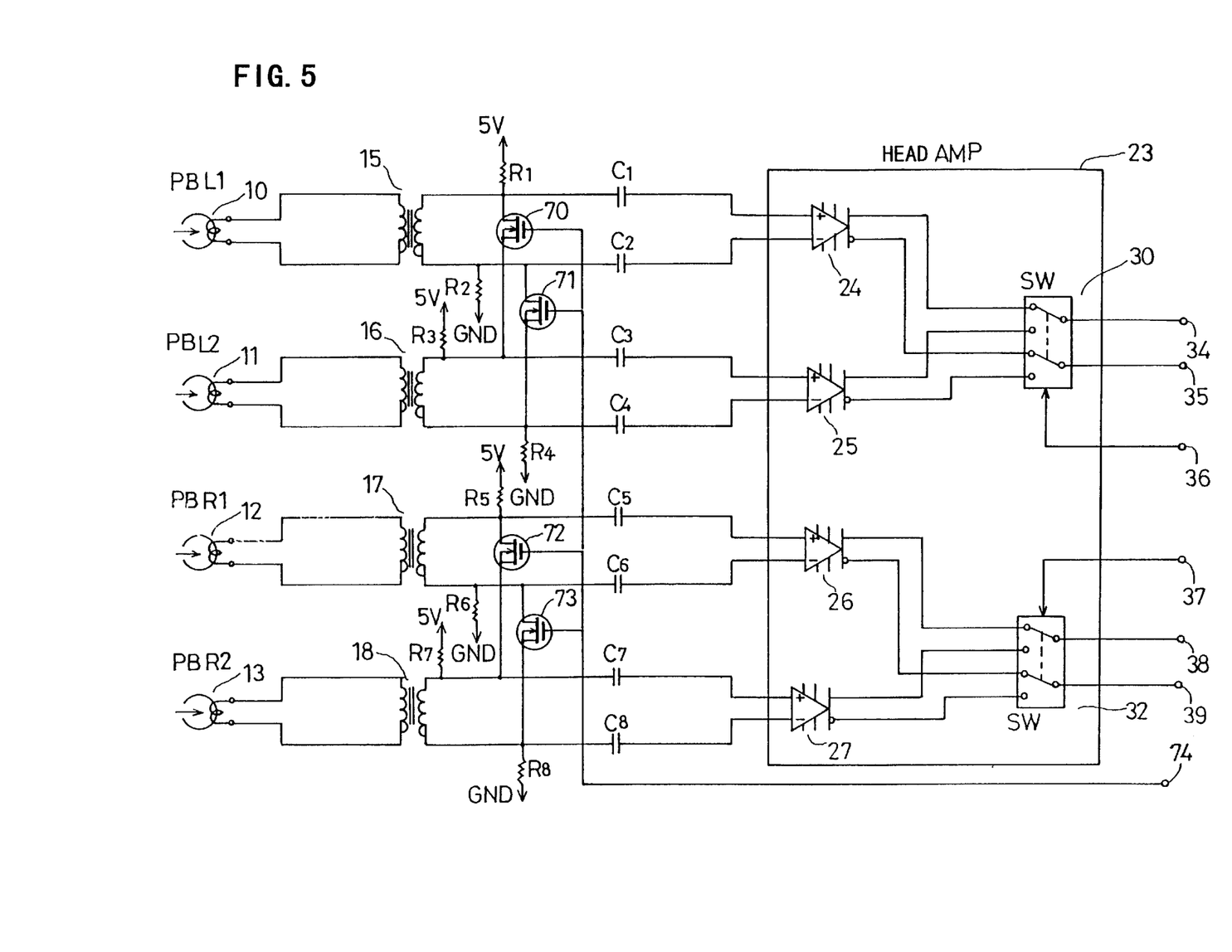
FIG. 5 is a circuit diagram of a third embodiment of the magnetic recording/playback apparatus.

Next, FIG. 5 shows a third embodiment of the magnetic recording/playback apparatus of the present invention. In FIG. 5, the elements which are essentially the same as corresponding elements in FIG. 4 are designated by the same reference numerals, and a description thereof will be omitted.

In the magnetic recording/playback apparatus of FIG. 5, MOSFETs (metal-oxide semiconductor field-effect transistors) 70, 71, 72 and 73 are provided instead of the switches 20A, 20B, 21A and 21B in the embodiment of FIG. 1. Each of the transistors 70, 71, 72 and 73 has an adequately low level of a resistance that is needed to turn the transistor ON (or in the closed position).

Generally, the stator and the rotor of the rotary transformer have a DC resistance on the order of several ohms, and it is necessary that the switch provided in the rotary transformer has an ON-setting resistance, needed to set the switch in the closed position, that is less than the order of several ohms. If it is difficult to set the ON-setting resistance of the switch at an adequately low level, it is necessary to increase the equivalent impedance of the switch by connecting a resistor on the order of 50 to 100 ohms to the stator of the rotary transformer.

In the magnetic recording/playback apparatus of FIG. 5, the supply voltage (for example, +5 V) is supplied through the resistor R1 to the stator-side high-voltage output of the transformer 15, and the stator-side low-voltage output of the transformer 15 is grounded (GND) via the resistor R2. The supply voltage is supplied through the resistor R3 to the stator-side high-voltage output of the transformer 16, and the stator-side low-voltage output of the transformer 16 is grounded via the resistor R4. The transistor 70 is connected between the stator-side high-voltage output of the transformer 15 and the stator-side high-voltage output of the transformer 16. Specifically, the MOSFET 70 has a gate connected to an external input terminal 74, a drain connected to the stator-side high-voltage output of the transformer 15, and a source connected to the stator-side high-voltage output of the transformer 16. Further, the transistor 71 is connected between the stator-side low-voltage output of the transformer 15 and the stator-side low-voltage output of the transformer 16. Specifically, the MOSFET 71 has a gate connected to the input terminal 74, a drain connected to the stator-side low-voltage output of the transformer 15, and a source connected to the stator-side low-voltage output of the transformer 16.

Further, in the magnetic recording/playback apparatus of FIG. 5, the supply voltage (for example, 5 V) is supplied through the resistor R5 to the stator-side high-voltage output of the transformer 17, and the stator-side low-voltage output of the transformer 17 is grounded via the resistor R6. The supply voltage is supplied through the resistor R7 to the stator-side high-voltage output of the transformer 18, and the stator-side low-voltage output of the transformer 18 is grounded via the resistor R8. The transistor 72 is connected between the stator-side high-voltage output of the transformer 17 and the stator-side high-voltage output of the transformer 18. Specifically, the MOSFET 72 has a gate connected to the input terminal 74, a drain connected to the stator-side high-voltage output of the transformer 17, and a source connected to the stator-side high-voltage output of the transformer 17. Further, the transistor 73 is connected between the stator-side low-voltage output of the transformer 17 and the stator-side low-voltage output of the transformer 18. Specifically, the MOSFET 73 has a gate connected to the input terminal 74, a drain connected to the stator-side low-voltage output of the transformer 17, and a source connected to the stator-side low-voltage output of the transformer 18.

In the present embodiment of the magnetic recording/playback apparatus, the transistors 70, 71, 72 and 73 are set in the closed position (or conduct electricity) during the read-after-write mode by supplying a high-level signal through the input terminal 74 to the gate of each of the transistors 70, 71, 72 and 73. The transistors 70, 71, 72 and 73 are set in the open position (or do not conduct electricity) during the normal read mode by supplying a ground-level signal through the input terminal 74 to the gate of each of the transistors 70, 71, 72 and 73.

Similar to the operation of the embodiment of FIG. 1, the transistors 70, 71, 72 and 73 in the present embodiment are set in the closed position during the read-after-write mode, and act to cancel the crosstalk at the playback heads 10, 11, 12 and 13 during the read-after-write mode operation. Accordingly, the magnetic recording/playback apparatus of the present embodiment is effective not only in reducing the degradation of the S/N ratio as in the conventional video tape recorder, but also in yielding a substantial elimination of the crosstalk during the read-after-write mode operation. It is possible that the magnetic recording/playback apparatus of the present embodiment provides a simple configuration with no need for significantly increasing the manufacturing cost.

Figure 6:
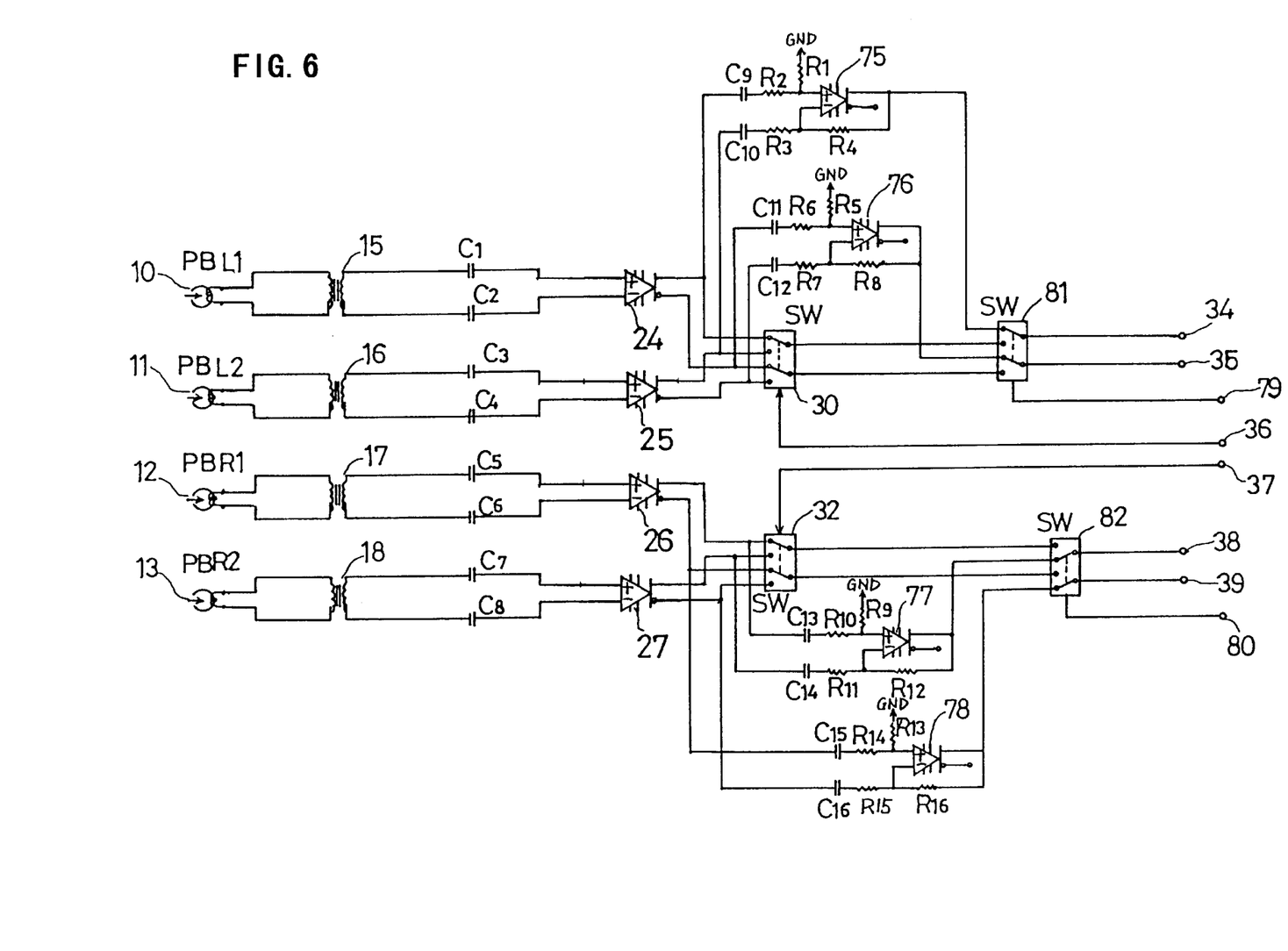
FIG. 6 is a circuit diagram of a fourth embodiment of the magnetic recording/playback apparatus.

Next, FIG. 6 shows a fourth embodiment of the magnetic recording/playback apparatus of the present invention. In FIG. 6, the elements which are essentially the same as corresponding elements in FIG. 1 are designated by the same reference numerals, and a description thereof will be omitted.

In the present embodiment, as shown in FIG. 6, differential amplifiers 75, 76, 77 and 78 are provided at the outputs of the amplifiers 24, 25, 26 and 27 instead of the switches 20A, 20B, 21A and 21B in the previous embodiment of FIG. 1. In the previous embodiment of FIG. 1, the crosstalk at the playback heads 10, 11, 12 and 13 during the read-after-write mode operation is substantially canceled but the amplitude of the playback currents is reduced to half of the original level. To eliminate this problem, in the present embodiment, the original-level amplitude of the playback currents can be retained and the crosstalk at the playback heads 10, 11, 12 and 13 during the read-after-write mode operation is substantially canceled.

In the magnetic recording/playback apparatus of FIG. 6, the playback heads 10, 11, 12 and 13 supply the signals, which are reproduced from the magnetic tape, to the rotor-side inputs of the transformers 15, 16, 17 and 18. The signal at the stator-side output of the transformer 15 is supplied through the capacitor C1 and the capacitor C2 to the amplifier 24. The signal at the stator-side output of the transformer 16 is supplied through the capacitor C3 and the capacitor C4 to the amplifier 25. The signal at the stator-side output of the transformer 17 is supplied through the capacitor C5 and the capacitor C6 to the amplifier 26. The signal at the stator-side output of the transformer 18 is supplied through the capacitor C7 and the capacitor C8 to the amplifier 27.

In the present embodiment of FIG. 6, the configuration of the differential amplifiers 75 and 76 at the outputs of the amplifiers 24 and 25 and a switch 81 at the output of the switch 30 is essentially the same as that of the differential amplifiers 77 and 78 at the outputs of the amplifiers 26 and 27 and a switch 82 at the output of the switch 32. Therefore, in the following, only a description of the differential amplifiers 75 and 76 and the switch 81 will be given and a description of the differential amplifiers 77 and 78 and the switch 82 will be omitted, for the sake of simplification of description.

As shown in FIG. 6, the amplifier 24 has a non-inverting output connected to both the switch 30 and a non-inverting input of the differential amplifier 75. The non-inverting output of the amplifier 24 is connected through a capacitor C9 and a resistor R2 to the non-inverting input of the differential amplifier 75. The non-inverting input of the differential amplifier 75 is grounded (GND) via a resistor R1. Further, the amplifier 24 has an inverting output connected to both the switch 30 and a non-inverting input of the differential amplifier 76. The inverting output of the amplifier 24 is connected through a capacitor C11 and a resistor R6 to the non-inverting input of the differential amplifier 76. The non-inverting input of the differential amplifier 76 is grounded (GND) via a resistor R5.

The amplifier 25 has a non-inverting output connected to both the switch 30 and an inverting input of the differential amplifier 75. The non-inverting output of the amplifier 25 is connected through a capacitor C10 and a resistor R3 to the inverting input of the differential amplifier 75. The inverting input of the differential amplifier 75 is connected through a resistor R4 to an output of the differential amplifier 75. Further, the amplifier 25 has an inverting output connected to both the switch 30 and an inverting input of the differential amplifier 76. The inverting output of the amplifier 25 is connected through a capacitor C12 and a resistor R7 to the inverting input of the differential amplifier 76. The inverting input of the differential amplifier 76 is connected through a resistor R8 to an output of the differential amplifier 76.

Hence, in the present embodiment, the differential amplifier 75 amplifies the current difference between the signal at the non-inverting output of the amplifier 24 and the signal at the non-inverting output of the amplifier 25, and acts to substantially cancel the crosstalk at the playback head 10 during the read-after-write mode while retaining the original-level amplitude of the playback current. The differential amplifier 76 amplifies the current difference between the signal at the inverting output of the amplifier 24 and the signal at the inverting output of the amplifier 25, and acts to substantially cancel the crosstalk at the playback head 11 during the read-after-write mode while retaining the original-level amplitude of the playback current.

Further, the switch 30 is connected at its outputs to the switch 81, and the outputs of the differential amplifiers 75 and 76 are connected to the switch 81. The switch 81 includes an input terminal 79 and the output terminals 34 and 35. A switching signal is supplied through the input terminal 79 to the switch 81. When the switching signal input to the switch 81 is set in an ON state (or during the read-after-write mode), the switch 81 is set in a first position so that the switch 81 passes the signals output by the differential amplifiers 75 and 76, to the output terminals 34 and 35. When the switching signal input to the switch 81 is set in an OFF state (or during the normal read mode), the switch 81 is set in a second position so that the switch 81 passes the signals at the outputs of the switch 30 to the output terminals 34 and 35.

Suppose that the setting of the switching signal, input to the switch 30, in the ON state or the OFF state is controlled in accordance with the timing of the alternate playback operations of the playback heads 10 and 11 indicated by (E) and (F) in FIG. 3. Further, suppose that the switching signal input to the switch 81 is set in the ON state when the magnetic recording/playback apparatus is run in the read-after-write mode, and the switching signal input to the switch 81 is set in the OFF state when the magnetic recording/playback apparatus is run in the normal mode.

As described above, the switches 81 and 82 in the present embodiment are set in the first position during the read-after-write mode, and the differential amplifiers 75, 76, 77 and 78 in the present embodiment act to substantially cancel the crosstalk at the playback heads 10, 11, 12 and 13 during the read-after-write mode operation while maintaining the original-level amplitude of the playback currents. Accordingly, the magnetic recording/playback apparatus of the present embodiment is effective not only in reducing the degradation of the S/N ratio as in the conventional video tape recorder, but also in yielding a substantial elimination of the crosstalk during the read-after-write mode operation with the original-level amplitude of the playback current being retained. It is possible that the magnetic recording/playback apparatus of the present embodiment provides a simple configuration with no need for significantly increasing the manufacturing cost.

Figure 7:
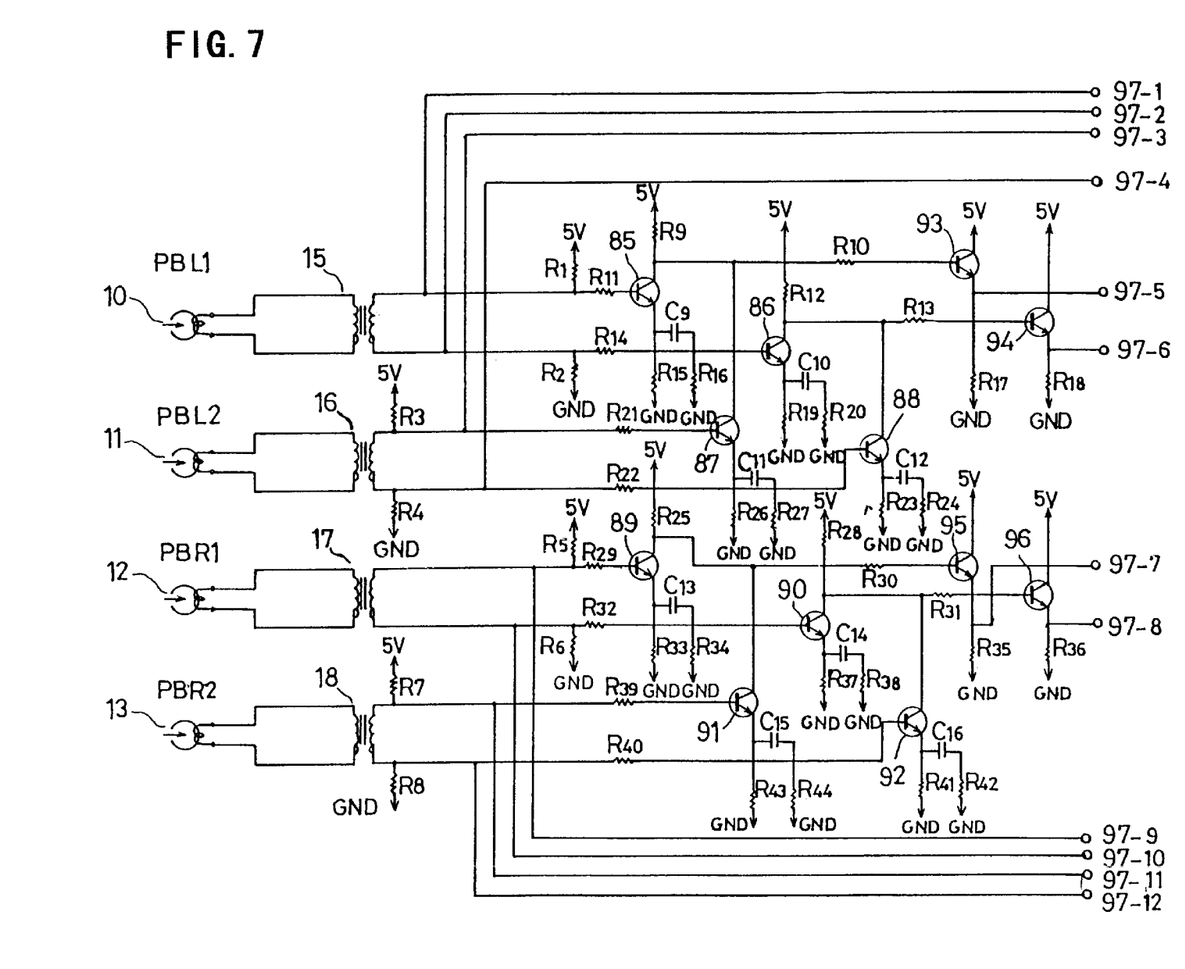
FIG. 7 is a circuit diagram of a part of a fifth embodiment of the magnetic recording/playback apparatus.
Figure 8:
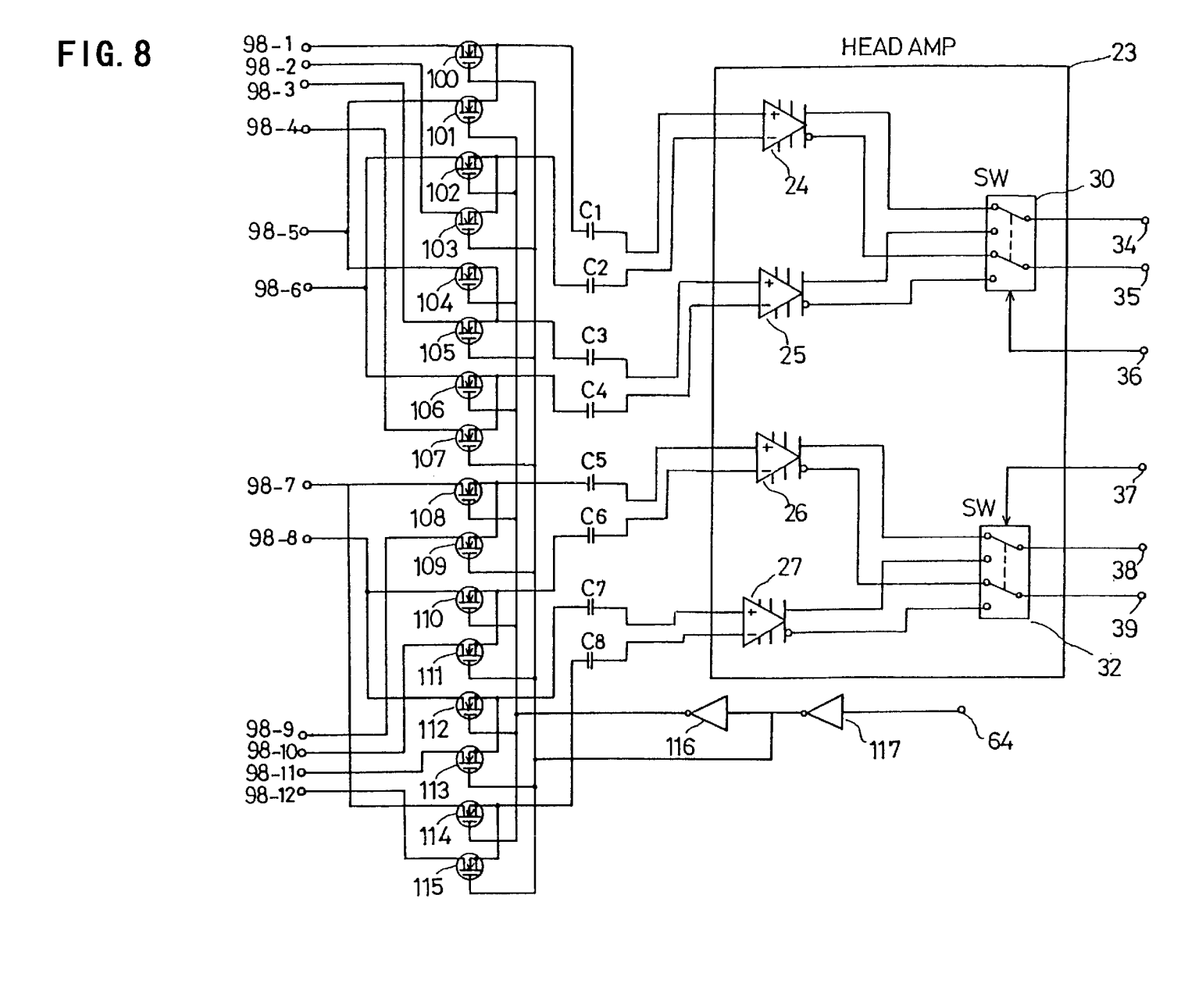
FIG. 8 is a circuit diagram of the remaining part of the fifth embodiment of the magnetic recording/playback apparatus.

Next, FIG. 7 and FIG. 8 show a fifth embodiment of the magnetic recording/playback apparatus of the present invention. A part of the magnetic recording/playback apparatus in the present embodiment is shown in FIG. 7, and the remaining part of the magnetic recording/playback apparatus is shown in FIG. 8. Suppose that output terminals 97-1 through 97-12 indicated in FIG. 7 are respectively connected to input terminals 98-1 through 98-12 indicated in FIG. 8 so as to constitute the magnetic recording/playback apparatus of the present embodiment.

In FIG. 7 and FIG. 8, the elements which are essentially the same as corresponding elements in FIG. 4 are designated by the same reference numerals, and a description thereof will be omitted.

In the magnetic recording/playback apparatus of FIG. 7 and FIG. 8, n-p-n bipolar transistors 85 through 96, MOSFETs 100 through 115 and NAND gates 116 and 177 are provided instead of the transistors 60 through 63 in the embodiment of FIG. 4.

In the present embodiment of FIG. 7 and FIG. 8, the configuration of the transistors 85–88 and 93–94 and the transistors 100–107 at the outputs of the transformers 15 and 16 is essentially the same as that of the transistors 89–92 and 95–96 and the transistors 108–115 at the outputs of the transformers 17 and 18. Therefore, in the following, only a description of the transistors 85–88 and 93–94, the transistors 100–107 and the NAND gates 116 and 117 will be given and a description of the transistors 89–92 and 95–96 and the transistors 108–115 will be omitted, for the sake of simplification of description.

As shown in FIG. 7, in the present embodiment of the magnetic recording/playback apparatus, the supply voltage (for example, +5 V) is supplied through the resistor R1 to the stator-side high-voltage output of the transformer 15, and the stator-side low-voltage output of the transformer 15 is grounded (GND) via the resistor R2. The supply voltage is supplied through the resistor R3 to the stator-side high-voltage output of the transformer 16, and the stator-side low-voltage output of the transformer 16 is grounded via the resistor R4.

As shown in FIG. 7 and FIG. 8, the transistor 85 has a base connected to the stator-side high-voltage output of the transformer 15 via a resistor R11. The MOSFET 100 has a drain connected to the stator-side high-voltage output of the transformer 15. The transistor 85 has a collector connected to the supply voltage line (+5 V) via a resistor R9, and the collector of the transistor 85 is connected to a base of the transistor 93 via a resistor R10, and connected to a collector of the transistor 87. The transistor 85 has an emitter grounded (GND) via a resistor R15, and the emitter of the transistor 85 is grounded (GND) via a capacitor C9 and a resistor R16.

The transistor 86 has a base connected to the stator-side low-voltage output of the transformer 15 via a resistor R14. The MOSFET 103 has a drain connected to the stator-side low-voltage output of the transformer 15. The transistor 86 has a collector connected to the supply voltage line (+5 V) via a resistor R12, and the collector of the transistor 86 is connected to a base of the transistor 94 via a resistor R13, and connected to a collector of the transistor 88. The transistor 86 has an emitter grounded (GND) via a resistor R19, and the emitter of the transistor 86 is grounded (GND) via a capacitor C10 and a resistor R20.

The transistor 87 has a base connected to the stator-side high-voltage output of the transformer 16 via a resistor R21. The MOSFET 105 has a drain connected to the stator-side high-voltage output of the transformer 16. The transistor 87 has a collector connected to the supply voltage line (+5 V) via the resistor R9, and the collector of the transistor 87 is connected to the base of the transistor 93 via the resistor R10. The transistor 87 has an emitter grounded (GND) via a resistor R26, and the emitter of the transistor 87 is grounded (GND) via a capacitor C11 and a resistor R27.

The transistor 88 has a base connected to the stator-side low-voltage output of the transformer 16 via a resistor R22. The MOSFET 107 has a drain connected to the stator-side low-voltage output of the transformer 16. The transistor 88 has a collector connected to the supply voltage (+5 V) via the resistor R12, and the collector of the transistor 88 is connected to a base of the transistor 94 via a resistor R13. The transistor 88 has an emitter grounded (GND) via a resistor R23, and the emitter of the transistor 88 is grounded (GND) via a capacitor C12 and a resistor R24.

In the present embodiment, the transistors 85, 86, 87 and 88 and the transistors 93 and 94 amplify the playback currents at the outputs of the transformers 15 and 16 to twice of the original-level amplitude of the playback currents. The collector of the transistor 85 and the collector of the transistor 87 are connected to each other, and the collector of the transistor 86 and the collector of the transistor 88 are connected to each other. Hence, the transistors 85, 86, 87 and 88 act to substantially cancel the crosstalk components at the outputs of the playback heads 15 and 16 during the read-after-write mode operation. When the crosstalk components are canceled, the twice-level amplitude of the playback currents are reduced to the original level by the transistors 85, 86, 87 and 88 and the transistors 93 and 94.

The transistor 93 has a collector connected to the supply voltage line (+5 V) and an emitter grounded via a resistor R17. The emitter of the transistor 93 is connected to both a drain of the MOSFET 101 and a drain of the MOSFET 104. As described above, the base of the transistor 93 is connected through the resistor R10 to both the collectors of the transistors 85 and 87. The transistor 94 has a collector connected to the supply voltage line (+5 V) and an emitter grounded via a resistor R18. The emitter of the transistor 94 is connected to both a drain of the MOSFET 102 and a drain of the MOSFET 106. As described above, the base of the transistor 94 is connected through the resistor R13 to both the collectors of the transistors 86 and 88.

The gates of the MOSFETs 100, 103, 105 and 107 are connected through the NAND gate 117 to the input terminal 64. The gates of the MOSFETS 101, 102, 104 and 106 are connected through the NAND gates 116 and 117 to the input terminal 64.

When the magnetic recording/playback apparatus of the present embodiment is run in the read-after-write mode, a high-level switching signal is supplied through the input terminal 64 to the gates of the MOSFETs 101, 102, 104 and 106. Hence, the MOSFETs 101, 102, 104 and 106 are set in the closed position (or conduct electricity) during the read-after-write mode, and pass the playback signals from the outputs of the transistors 93 and 94, to the head amplifier 23.

When the magnetic recording/playback apparatus of the present embodiment is run in the normal read mode, a low-level (or ground-level) switching signal is supplied through the input terminal 64 to the gates of the MOSFETs 100, 103, 105 and 107. Hence, the MOSFETs 100, 103, 105 and 107 are set in the closed position (or conduct electricity) during the normal read mode, and pass the playback signal from the output of the transformer 15, to the head amplifier 23.

The source of the MOSFET 100 and the source of the MOSFET 101 are connected to each other, and they are connected through the capacitor C1 to the non-inverting input of the amplifier 24. The source of the MOSFET 102 and the source of the MOSFET 103 are connected to each other, and they are connected through the capacitor C2 to the inverting input of the amplifier 24. The source of the MOSFET 104 and the source of the MOSFET 105 are connected to each other, and they are connected through the capacitor C3 to the non-inverting input of the amplifier 25. The source of the MOSFET 106 and the source of the MOSFET 107 are connected to each other, and they are connected through the capacitor C4 to the inverting input of the amplifier 25. Other elements in the present embodiment are essentially the same as corresponding elements in the embodiment of FIG. 4.

As described above, the configuration of the transistors 89–92 and 95–96 and the transistors 108–115 at the outputs of the transformers 17 and 18 is essentially the same as that of the transistors 85–88 and 93–94 and the transistors 100–107 at the outputs of the transformers 15 and 16, and a description thereof will be omitted.

Similar to the operation of the embodiment of FIG. 6, the magnetic recording/playback apparatus of the present embodiment acts to substantially cancel the crosstalk at the playback heads 10, 11, 12 and 13 during the read-after-write mode operation while maintaining the original-level amplitude of the playback currents. Accordingly, the magnetic recording/playback apparatus of the present embodiment is effective not only in reducing the degradation of the S/N ratio as in the conventional video tape recorder, but also in yielding a substantial elimination of the crosstalk during the read-after-write mode operation with the original-level amplitude of the playback current being retained.

Further, the present invention is not limited to the above-described embodiments, and variations and modifications may be made without departing from the scope of the present invention.

The present invention is based on Japanese priority application No.10-007,007, filed on Jan. 16, 1998, the entire contents of which are hereby incorporated by reference.

What is claimed is:

1. A magnetic recording/playback apparatus for recording information to a magnetic tape and playing back the information from the magnetic tape, comprising:

first and second recording heads, provided on a rotary cylinder, for alternately recording information to the magnetic tape;

first and second playback heads, provided on the rotary cylinder at predetermined positions relative to the first and second recording heads, for alternately playing back the information from the magnetic tape; and crosstalk canceling switch means for canceling crosstalk at outputs of the first and second playback heads when the apparatus is run in a read-after-write mode, the crosstalk canceling switch means being set in a closed position during the read-after-write mode and interconnecting the output of the first playback head and the output of the second playback head.

2. The apparatus according to claim 1, wherein the output of the first playback head is connected to a first transformer having a high-voltage output and a low-voltage output, and the output of the second playback head is connected to a second transformer having a high-voltage output and a low-voltage output, and wherein the crosstalk canceling switch means includes a first switch connected between the high-voltage output of the first transformer and the high-voltage output of the second transformer, and a second switch connected between the low-voltage output of the first transformer and the low-voltage output of the second transformer.

3. The apparatus according to claim 1, wherein the output of the first playback head is connected to a first transformer, the first transformer having a high-voltage output and a low-voltage output, and the output of the second playback head is connected to a second transformer, the second transformer having a high-voltage output and a low-voltage output, and wherein the crosstalk canceling switch means includes a first bipolar transistor connected between the high-voltage output of the first transformer and the high-voltage output of the second transformer, and a second bipolar transistor connected between the low-voltage output of the first transformer and the low-voltage output of the second transformer.

4. The apparatus according to claim 3, wherein the first bipolar transistor has a collector connected to the high-voltage output of the first transformer and an emitter connected to the high-voltage output of the second transformer, and the second bipolar transistor has a collector connected to the low-voltage output of the first transformer and an emitter connected to the low-voltage output of the second transformer.

5. The apparatus according to claim 3, wherein the apparatus includes an external input terminal connected to both bases of the first and second bipolar transistors, and a high-level signal is supplied through the input terminal to the bases of the first and second bipolar transistors when the apparatus is run in the read-after-write mode.

6. The apparatus according to claim 1, wherein the output of the first playback head is connected to a first transformer, the first transformer having a high-voltage output and a low-voltage output, and the output of the second playback head is connected to a second transformer, the second transformer having a high-voltage output and a low-voltage output, and wherein the crosstalk canceling switch means includes a first field-effect transistor connected between the high-voltage output of the first transformer and the high-voltage output of the second transformer, and a second field-effect transistor connected between the low-voltage output of the first transformer and the low-voltage output of the second transformer.

7. The apparatus according to claim 6, wherein the first field-effect transistor has a drain connected to the high-voltage output of the first transformer and a source connected to the high-voltage output of the second transformer, and the second field-effect transistor has a drain connected to the low-voltage output of the first transformer and a source connected to the low-voltage output of the second transformer.

8. The apparatus according to claim 6, wherein the apparatus includes an external input terminal connected to both gates of the first and second field-effect transistors, and a high-level signal is supplied through the input terminal to the gates of the first and second field-effect transistors when the apparatus is run in the read-after-write mode.

9. The apparatus according to claim 1, wherein the apparatus includes:
- a first amplifier, coupled to the output of the first playback head, the first amplifier having a non-inverting output and an inverting output;
- a second amplifier, coupled to the output of the second playback head, the second amplifier having a non-inverting output and an inverting output;
- a first differential amplifier having a non-inverting input connected to the non-inverting output of the first amplifier and an inverting input connected to the non-inverting output of the second amplifier; and
- a second differential amplifier having a non-inverting input connected to the inverting output of the first amplifier and an inverting input connected to the inverting output of the second amplifier.

10. The apparatus according to claim 1, wherein the apparatus includes:
- a first transformer coupled to the output of the first playback head, the first transformer having a high-voltage output and a low-voltage output;
- a second transformer coupled to the output of the second playback head, the second transformer having a high-voltage output and a low-voltage output;
- first and second bipolar transistors coupled to the high-voltage output of the first transformer and the high-voltage output of the second transformer, respectively, the first bipolar transistor having a collector connected to a collector of the second bipolar transistor;
- third and fourth bipolar transistors coupled to the low-voltage output of the first transformer and the low-voltage output of the second transformer, respectively, the third bipolar transistor having a collector connected to a collector of the fourth bipolar transistor;
- a fifth bipolar transistor coupled to both the collectors of the first and second bipolar transistors; and
- a sixth bipolar transistor coupled to both the collectors of the third and fourth bipolar transistors.

* * * * *